(12) United States Patent
Cleverley

(10) Patent No.: US 12,106,063 B2
(45) Date of Patent: *Oct. 1, 2024

(54) METHOD AND SYSTEM FOR GENERATING A SURPRISINGNESS SCORE FOR SENTENCES WITHIN GEOSCIENCE TEXT

(71) Applicant: ExxonMobil Technology and Engineering Company, Spring, TX (US)

(72) Inventor: Paul Hugh Cleverley, Oxfordshire (GB)

(73) Assignee: ExxonMobil Technology and Engineering Company, Spring, TX (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/611,445

(22) PCT Filed: May 18, 2020

(86) PCT No.: PCT/US2020/070056
§ 371 (c)(1),
(2) Date: Nov. 15, 2021

(87) PCT Pub. No.: WO2020/237256
PCT Pub. Date: Nov. 26, 2020

(65) Prior Publication Data
US 2022/0237387 A1    Jul. 28, 2022

Related U.S. Application Data

(63) Continuation-in-part of application No. 16/416,202, filed on May 18, 2019, now Pat. No. 11,270,078.

(51) Int. Cl.
*G06F 40/30* (2020.01)
*G06F 18/214* (2023.01)
(Continued)

(52) U.S. Cl.
CPC ............ *G06F 40/40* (2020.01); *G06F 18/214* (2023.01); *G06F 40/284* (2020.01); *G06N 20/00* (2019.01)

(58) Field of Classification Search
CPC ...... G06F 40/30; G06F 40/295; G06F 40/284; G06F 40/206
See application file for complete search history.

(56) References Cited

U.S. PATENT DOCUMENTS

2017/0075877 A1*  3/2017 Lepeltier ............... G06F 40/117
2017/0255686 A1*  9/2017 Ross ....................... G06F 16/26
(Continued)

OTHER PUBLICATIONS

Huang, Jizhou, et al. "Learning to recommend related entities with serendipity for web search users." ACM Transactions on Asian and Low-Resource Language Information Processing (TALLIP) 17.3 (2018): 1-22. (Year: 2018).*

(Continued)

*Primary Examiner* — Jialong He
(74) *Attorney, Agent, or Firm* — ExxonMobil Technology and Engineering Company—Law Department

(57) ABSTRACT

The invention is a data processing method and system for suggesting insightful and surprising sentences to geoscientists from unstructured text. The data processing system makes the necessary calculations to assign a surprisingness score to detect sentences containing several signals which when combined exponentially, have tendencies to give rise to surprise. In particularly, the data processing system operates on any digital unstructured text derived from academic literature, company reports, web pages and other sources. Detected sentences can be used to stimulate ideation and learning events for geoscientists in industries such as oil and gas, economic mining, space exploration and Geo-health.

10 Claims, 6 Drawing Sheets

(51) Int. Cl.
    *G06F 40/284*     (2020.01)
    *G06F 40/295*     (2020.01)
    *G06F 40/40*     (2020.01)
    *G06N 20/00*     (2019.01)

(56) References Cited

U.S. PATENT DOCUMENTS

| | | | | |
|---|---|---|---|---|
| 2019/0378179 | A1* | 12/2019 | Cleverley | G06Q 50/01 |
| 2021/0103703 | A1* | 4/2021 | Galitsky | G06N 5/04 |
| 2021/0165829 | A1* | 6/2021 | Dornbush | G06Q 10/101 |

OTHER PUBLICATIONS

Makri, Stephann, et al. ""Making my own luck": Serendipity strategies and how to support them in digital information environments." Journal of the Association for Information Science and Technology 65.11 (2014): 2179-2194. (Year: 2014).*

Race, Tammera M. "Resource discovery tools: Supporting serendipity." Planning and implementing resource discovery tools in academic libraries. IGI Global, 2012. 139-152. (Year: 2012).*

Thudt, Alice, Uta Hinrichs, and Sheelagh Carpendale. "The bohemian bookshelf: supporting serendipitous book discoveries through information visualization." Proceedings of the SIGCHI conference on human factors in computing systems. 2012. (Year: 2012).*

Edward Foster, Allen, and David Ellis. "Serendipity and its study." Journal of Documentation 70.6 (2014): 1015-1038. (Year: 2014).*

\* cited by examiner

| Surprisingness Score | Geoscience Sentence (from Public Domain literature) |
|---|---|
| 4346122.647 | They found that the generative potential of the Kurrachine Dolomite Formation of the Hayan Block was underestimated and that Triassic source rock reservoir pair is a may or play in the area |
| 3412993.155 | Extraordinary sealing was represented by the thick salt evaporate layers D2 salt and salt on top of the Kurrachine Dolomite Formation bottom part of Kurrachine Anhydrite Formation |
| 3104548.466 | In essence the seismic data may have imaged the reflection moho or alternatively has recorded the fossilization of a paleo moho within the attenuated continental crust |
| 2789417.802 | In the Congo Basin more than 19,000 km of seismic profiles from the Zal Ango project have been interpreted showing that the Tertiary Congo deep sea fan is much broader and thicker than formerly estimated |
| 2705969.079 | the North Falkland Basin in 2004 with the shooting of otherwise overlooked plays and the first new |
| 2411447.822 | Due to the lack of sample material there is currently a data gap in central and southern costal Mozambique further South there is a curious development of Upper Jurassic source rocks in southern South Africa seen as far north at the Durban basin |
| 2086259.774 | Exploration results show that the generative potential of the Triassic source rocks in the Hayan Block was underestimated |
| 1862463.835 | If however the shale occurs in the form of discreet thin beds and laminae the interbedded sandstones can retain significant reservoir quality and a very different prospect emerges |
| 1837937.947 | Although they have a similar distribution Talara Basin province oils tend to be slightly heavier than those of the Progreso Basin province |
| 1700912.459 | In particular a model that provides a reasonable estimate for oceanic crustal thickness beneath the Argentine Basin and Scotia Sea predicts a crustal thickness beneath the Falkland Plateau Basin that is significantly larger than previously inferred from limited deep seismic evidence |
| ... | ... |
| 0 | these are the basal solling sandstone lower detfurth sandstone and lower volpriehausen sandstone members |
| 0 | oligocene plume volcanism plume related volcanism commenced in the early oligocene with extrusion of the alba basalt and its lateral equivalents fig |
| 0 | following assignments in peru london cairo he returned to the hague in 1995 and was senior stratigrapher in the kuwait joint study team |
| 0 | the middle to late Eocene was a time of major plate wide compression corresponding to the initial period of continental collision along the northern arabian margin |
| 0 | an early cretaceous marine transgression covered the eastern margin of the levantine basin accompanied by an influx of siliciclastic and detrital carbonate sediments brew et al 2001 gardosh and druckman 2006 |
| 0 | the tops of the nukhul formation in the gulf of suez and the tayran group along the northern saudi arabian red sea margin figs |
| 0 | northward plate movement continued during the late cretaceous and a transform fault became active along the ninety east ridge fig |
| 0 | Western employed the f k technique as a supplement to the conventional pre stack demultiple routines parabolic radon transform and tau p deconvolution |
| 0 | This probably produced minor compression and uplift in the northernmost gulf of suez patton et al 1994 |
| 0 | Reservoir rocks include Miocene alluvial sandstone paleogene shelf carbonates Jurassic and Permian continental sandstones and cambrian alluvial and shoreface sandstones |

FIG. 5

METHOD AND SYSTEM FOR GENERATING A SURPRISINGNESS SCORE FOR SENTENCES WITHIN GEOSCIENCE TEXT

CROSS-REFERENCE TO RELATED APPLICATIONS

This application is a national stage application under 35 USC 371 of International Application No. PCT/US2020/070056 filed on May 18, 2020, which is a continuation-in-part of U.S. patent application Ser. No. 16/416,202, filed May 18, 2019, the entirety of which is incorporated by reference herein. This application is also related to U.S. Patent Application Publication No. 2019/0378179 and PCT Application Publication No. WO 2019/241360, the disclosures of which are incorporated herein by reference.

FIELD OF THE INVENTION

The present application relates to the intersection of information retrieval, natural language processing, and artificial intelligence. In particular, the present application relates to methods and systems for generating surprisingness scores, and the use of such methods and systems in petroleum geoscience applications.

BACKGROUND

Almost any search result in a corporate or scholarly search engine will return too many results for a geoscientist to read. Research shows that over 90% of people never click past page one of search results. Thus, it is likely that potential knowledge remains hidden by its obscurity from the searcher. As geoscientists are involved in retroductive science (inductive, deductive, and abductive reasoning) they are effectively in the 'ideas business' and would benefit from being stimulated by search engines to a greater extent than is currently in place. This presents an opportunity for inventions to present what is potentially 'surprising' to the searcher, differing from text summarization recommender systems which concern themselves with summing up the 'main points' of a document or what is popular (An Bui et al 2016).

Innovation or creativity sparked by an unexpected seemingly random event is often called serendipity, a happy accident. Surprise has been classed as an emotion but is now thought by many scholars to be an epistemic concept, with emotion as a potential by-product. On closer inspection, some scholars argue serendipity is not an accident, but a capability (de Rond and Morley 2010). For this context, serendipity has been described as an unexpected, insightful and valuable information encounter (Makri et al 2014, De Rond and Morley 2010).

Serendipity as a phenomenon is unlikely to be predictable or controllable; however, developing a capability in a user interface that may improve the tendency for serendipitous encounters to occur is considered plausible based on the existing literature (Andre et al. 2009, McCay-Peet and Toms 2011, McCay Peet et al 2014).

In information searching, facilitating serendipity is focused on what is deemed most novel or interesting based on the information seekers background expectations (McCay-Peet and Toms 2011), rather than relevance to a specific task or goal. Erdelez et al (2011) argue that serendipitous information encountering is not well represented in established information literacy models and therefore is often not present in system design practices and search user interfaces.

Toms and McCay-Peet (2009) introduced random documents into a search user interface to meet the latent need of 'show me something I don't already know' with generally poor results. This illustrates the challenges which exist trying to facilitate serendipity in digital environments, whilst mitigating the potential for distraction (Siefring et al 2012).

Collaborative filtering techniques have been shown to generate serendipitous information encounters (Martin and Quan-Haase 2014, Rasmus 2013, Zhang et al 2012) although suggestions will be limited by previous activity. This has could be described as 'discovery through the rear-view mirror' despite it being one of the most popular recommendation techniques. In vertical domains like geoscience, usage data is likely to be small compared to sectors such as retail, limiting the potential value of mass market collaborative filtering techniques.

The detection of surprise has been generated statistically by comparing word distributions (text embeddings, Topic Models) between documents (Trahan and Foehse 2010) although that will most likely smooth out finer grained sentences. Derezinski et al (2017) generated a surprisingness score for documents (and sentences) based on unsupervised machine learning and Jensen-Shannon divergence. Similarly, Zhang et al (2009) computed a purely statistical based surprisingness score for multi-dimensional data by looking for anomalies between the measured data recordings.

Yuksel and Ratinov (2013) computed a surprisingness score to detect fraudulent business titles by looking at the surprisingness of word combinations in titles, compared to an average baseline. Bedathur et al (2010) developed a method to detect interesting phrases rather than keywords, focusing on phrases that were common in a subset of the corpus, but infrequent relative to the entire corpus. Malik and Olof-Ors (2016) developed a method to determine the significance of entity associations through statistical techniques. Word co-occurrence techniques (Cleverley and Burnett 2015a; 2015b) using Pointwise Mutual Information (PMI) have been shown to suggest surprising associations but with limited success rates. Where time-series data is present, a surprisingness score has been created as a slope discontinuity, comparing term frequency changes over time (Whitney et al 2009).

There are a number of limitations for unsupervised statistical only techniques. Firstly, 'Shannon surprise' techniques fail to take into account user expectation within a domain. Where what is uncommon (in frequency terms within a corpus) is not necessarily what is surprising. Secondly, these approaches require very large datasets otherwise statistically infrequent words and associations from a geoscience domain perspective, will most likely be artefacts (noise) of a small dataset.

In sentiment analysis (emotion detection), lexicons have been used to detect the expression of surprise within text, typically on social media (Cele et al 2017). These do not take into account informative features that geoscientists may consider most likely to surprise.

Thus, no method exists to compute a surprisingness score for geoscience sentences using theory guided Natural Language Processing (NLP) and Machine Learning (ML). As such, it would therefore be desirable to have a data processing system and method to compute a surprisingness score for geoscience sentences. With such a system and method, sentences with the highest surprisingness score from within a document, collection or search result can be suggested to the searcher in a new or existing search user interface. This would be useful because there is too much potentially relevant information available for geoscientists to read.

Therefore, facilitating serendipity and identifying small patterns within texts could spark a learning event and ideation, leading to a new business opportunity that current methods do not allow.

Background references include U.S. Pat. No. 7,506,274 to Zhang et al. (2009), U.S. Pat. No. 8,473,491 to Yuksel and Ratinov (2013), and U.S. Pat. No. 9,495,635 to Malik and Olof-Ors (2016).

Additional background references include: An Bui et al. (2016) "Extractive text summarization system to aid data extraction from full text in systematic review development", Journal of Biomedical Informatics, 64, pp 265-272; Andre et al. (2009) "Discovery Is Never by Chance: Designing for (Un) Serendipity" in Bryan-Kinns et al., Eds. Proceedings of the seventh Association for Computing Machinery (ACM) conference Creativity and Cognition (C&C). Oct. 26-30 2009. Berkeley, California, USA: ACM, pp. 305-314; Bedathur et al. (2010) "Interesting-phrase mining for ad-hoc text analytics", Proceedings of the VLDB Endowment, Sep issue 3(1-2); Celle et al. (2017) "Expressing and detecting surprise", John Benjamins Publishing Company, Amsterdam; Cleverley, P. H. and Burnett, S., (2015a) "Creating Sparks: Comparing Search Results Using Discriminatory Search Term Word Co-Occurrence to Facilitate Serendipity in the Enterprise", Journal of Information and Knowledge Management, (JIKM) 14(1), pp. 1-27; Cleverley, P. H. and Burnett, S., (2015b) "Retrieving haystacks: a data driven information needs model for faceted search" Journal of Information Science (JIS), 41(1), pp. 97-113; Cleverley (2019) "Show me something I don't already know" Expert Centric Digital Technology, Geological Society of London, 24th January, London UK; De Rond and Morley (2010) "Serendipity: Fortune and the Prepared Mind" UK: Cambridge University Press; Derezinski (2018) "Discovering Surprising Documents with Context-Aware Word Representations", Proceedings IUI 23rd International Conference on Intelligent User Interfaces, Tokyo, March 7-11. pp 31-35; Erdelez et al. (2011) "Potential for inclusion of information encountering within information literacy models", Information Research, 16(3) (online), available from: http://www.informationr.net/ir16-3/paper489.html [accessed November 2019]; Makri et al. (2014) ""Making my own luck": Serendipity strategies and how to support them in digital information environments", Journal of the Association for Information Science and Technology, 65(11), pp. 2179-2194; Martin and Qum-Haase (2014) "Designing the next big thing: Randomness versus Serendipity in DH tools", Digital Humanities. Jul. 7-12th 2014: Lausanne, Switzerland; McCay-Peet and Toms (2011) "Measuring the dimensions of serendipity in digital environments", Information Research, 16(3), available from: http://www.informationr.net/ir163/paper483.html (accessed May 2019); McCay-Peet et al. (2014) "Development and assessment of content validity of a scale to measure how well a digital environment facilitates serendipity", Information Research, 19(3) (online), available from: http://www.informationr.net/ir/193/pape630.htm 1 #.WFKM6oXXLml (accessed May 2019); Rasmus (2013) "The Serendipity Economy" (online), Harvard Business Review (HBR), available from: http://blogs.hbr.org/2013/08/how-it-professionals-can-embrace-the-serendipity (accessed May 2019); Siefring et al. (2012) "Problematic aspects of 'serendipity in information seeking.'", Poster presented at the Serendipity, Chance and the Opportunistic Discovery of Information Research (SCORE) Workshop. April 28-May 1 2012, Montreal, Canada; Toms and McCay-Peet (2009) "Chance Encounters in the Digital Library" in AGOSTI, M. et al., Eds. Research and Advanced Technology for Digital Libraries: 13th European Conference (ECOL). September 27-Oct. 2 2009. Corfu, Greece: Springer, pp. 192-202; Trahan and Foehse (2010). A toolkit for detecting technical surprise. Sandia National Laboratories. Report SAND2010-739; Whitney et al. (2009) "Mining for Surprise Events within Text Streams", Proceedings of the 2009 SIAM International Conference on Data Mining hpps://epubs.siam.ora/doi/10.1137/1.978161197279.53; Zhang et al. (2012) "Auralist: Introducing serendipity into music recommendation", Proceedings of the 5th Association for Computing Machinery (ACM) international conference on Web search and data mining. Feb. 8-12th 2012. Seattle, USA: ACM, pp. 13-22.

SUMMARY

The present invention provides methods and systems for computing a surprisingness score for sentences in geoscience text using theory guided natural language processing and machine learning. The present invention output's sentences from a textual document with a surprisingness score which can be used to rank sentences across documents sets and search results. This can be used within search user interfaces, to surface signals (sentences) containing the most surprising sentences buried in search result lists. These can be presented to users of the system, potentially accelerating learning opportunities.

Accordingly, in one aspect, the methods and systems of the present application can be used to a surprisingness score for a sentence. Table 1 (below) illustrates elements that may be used in computing the surprisingness score.

TABLE 1

Key elements in computing surprisingness score

| Method | Description (Embodiment) |
|---|---|
| 1 Informative Features | Sentences that (i) express surprise, (ii) changes in knowledge, (iii) outliers, (iv) contradictions, (v) similarity/contrast are more likely to be surprising to a geoscientist than ones which are more factual: E.g. "had abnormal porosity . . .", "was previously assumed that . . .", "in reality however . . .", "way larger than expected . . .", "no consensus on the model . . .", "instead encountered . . .", "much thicker than the earlier . . .", compared to the more factual "the well was drilled in 2017", "this was followed by . . .", "the basin subsided", "the rocks are Devonian . . .", etc. |
| 2 Specificity | Sentences which are specific containing a geoscience/geographical Named Entity, are more likely to be surprising to a geoscientist than more general ones. E.g. "the |

TABLE 1-continued

Key elements in computing surprisingness score

| | Method | Description (Embodiment) |
|---|---|---|
| | | south part of the Illizi basin was deep" is more specific than the general phrase "geological basins are deep" (which contains no Named Entities). |
| 3 | Domain Relevance | Sentences which contain geoscience terms in the domain of interest are more likely to be deemed surprising by geoscientists than those which do not. E.g. 'source rock', 'reservoir', 'trap' rather than general terms e.g. 'rock', 'geology', 'ocean' |
| 4 | Overall Sentence Informativeness | Sentences that contain more Noun Phrases as a ratio to the total words in the sentence, are likely to contain more 'information'. E.g., "The Cretaceous Graben contains the organic rich Cromer Group", as opposed to the less noun phrase heavy (rather bland), "Research can be conducted in a number of ways through a variety of techniques" |

The combination of these four elements and an exponential weighting algorithm in a filter, can be used to compute a surprisingness score for a sentence.

Accordingly, in one aspect, a computer process as implemented, involves receiving sentences from a plurality of sentences and lexicons from a plurality of lexicons in computer memory. These data in the computer memory are processed with a computer processor to compute the existence of certain features in the sentence. A surprisingness score is computed which considers the geoscience domain perspective. A preferred embodiment is informative features derived through machine learning, geoscience dictionary (lexicon) and rules-based method. This is achieved by applying a filter to sentences and detecting the presence of certain domain terms, named entities, surprising features and noun phrases.

In another aspect, a computer program utilizes computer disk (storage) in which instruction code resides. These instructions when processed by a computer, instruct the computer to compute a surprisingness score for sentences, unusual associated words and learn from user feedback. The techniques could be implemented in digital circuitry, hardware, firmware or software. The techniques can be implemented in a computer program written in any form of programming language and on any operating system.

Additional embodiments could include one or more computer devices configured to carry out the instructions.

BRIEF DESCRIPTION OF THE DRAWINGS

The advantages of the present invention may be better understood by referring to the following detailed description and the attached figures.

FIG. 5 illustrates a sample output from the present techniques ranking sentences by surprisingness score in accordance with one or more embodiments of the present techniques.

NOMENCLATURE

Figure 1:
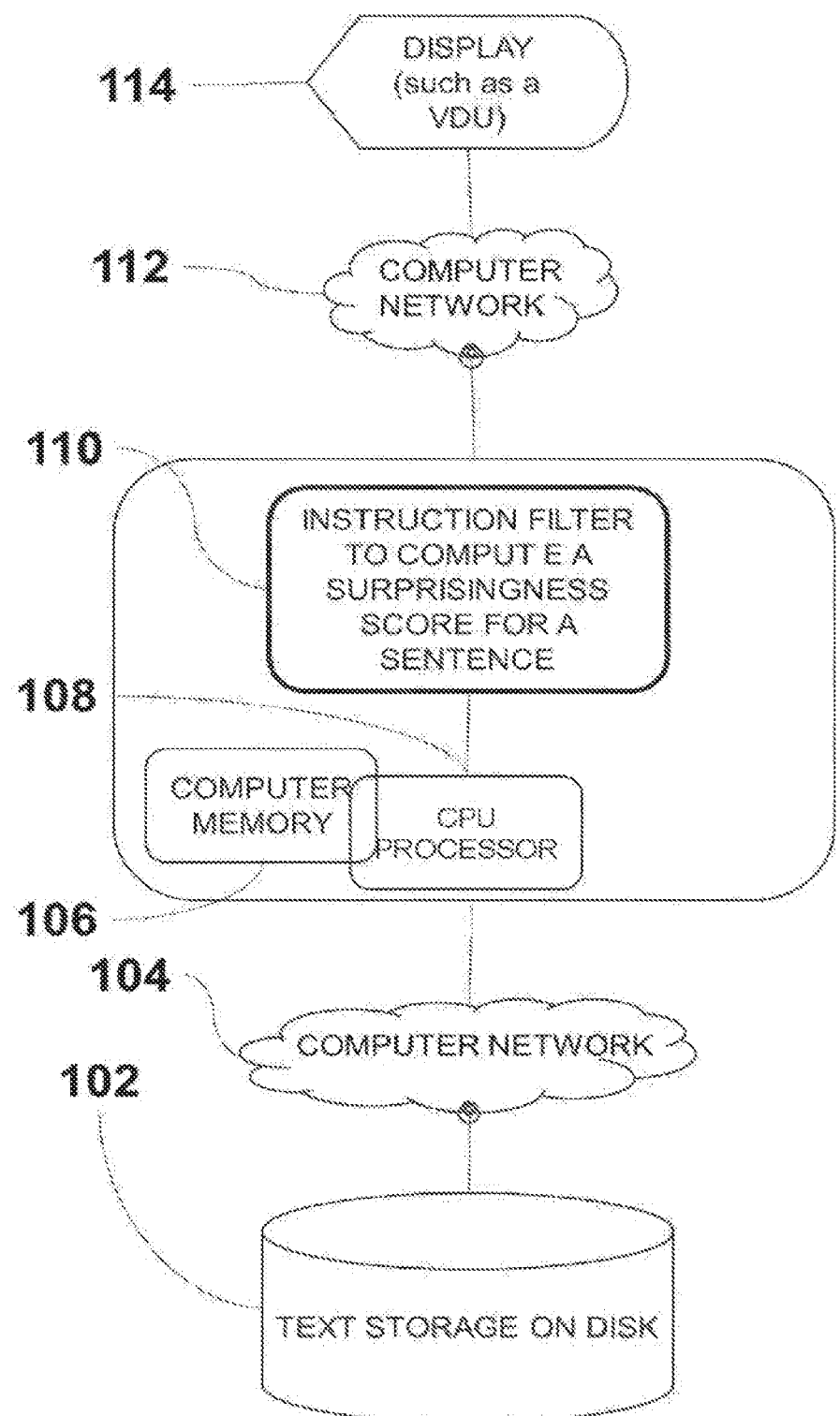
FIG. 1 provides a diagram illustrating an exemplary system architecture.

Various terms used throughout this disclosure are defined below. To the extent a term used in a claim is not defined below, it should be given the broadest reasonable definition persons in the pertinent art have given that term as reflected in at least one printed publication or issued patent.

A geoscience lexicon is a set of terms that describe concepts in a geoscience domain. For example, in petroleum geoscience they may include the terms 'oil well', 'basin', 'source rock', 'reservoir', 'trap', and 'seal'.

Named entities are real world instances of things. For example, an oil well is an entity, an attribute of that entity would be its status (such as 'dry' or 'oil'. A Named Entity would be an instance such as the specific well 47/4b-4 (in the North Sea).

A Geological Basin is an entity and there are types of basin (such as Foreland Basin or Cratonic Basin). A Named Entity in this case would be Permian Basin which is a defined spatial realm in the United States.

An Informative Feature is one which has been derived through supervised machine learning. For example, through the process of labelling thousands of sentences as being 'surprising' to a geoscientist, the statistical machine learning algorithm may have computed that the word 'instead' is a term that carries a high probability (should it exist in a sentence) as a marker for surprise, as it rarely occurs in sentences labeled as 'not surprising' In another embodiment, a lexicon of terms, phrases and mirative utterances (deemed as clues for surprisingness) may be used to achieve a similar effect.

DETAILED DESCRIPTION

In the following detailed description, specific embodiments of the present disclosure are described in connection with preferred embodiments. However, to the extent that the following disclosure is specific to a particular embodiment or a particular use, this is intended to be for exemplary purposes only and to simply provide a description of the exemplary embodiments. Accordingly, the disclosure is not limited to the specific embodiments described below, but rather, it includes all alternatives, modifications, and equivalents falling within the true spirit and scope of the appended claims.

Disclosed herein are methods and systems for computing a surprisingness score for a sentence in geoscience text. As an example, take the following sentence: "The Anaconda Well was meant to target the Cretaceous Play but instead encountered a deeper carbonate reservoir".

This sentence would receive a relatively high surprisingness score as it contains (referring to Table 1):
1. An informative feature with a high probability for surprisingness ( . . . but instead . . . )
2. A geoscience Named Entity (Anaconda Well; Cretaceous Play)
3. Geoscience lexicon terms (carbonate, reservoir)
4. A high Noun Phrase ratio to total words in the sentence (Informativeness)

The scoring mechanism will be discussed further with reference to FIG. 4, but generally the elements are listed in order of importance with an exponential weighting mechanism employed for scoring. The surprisingness score being the product of these element scores.

The system architecture (FIG. 1 and FIG. 2) is intended as an example, not to impose any architectural limitations on other possible embodiments. FIG. 1 identifies the components comprising of non-volatile hardware storage (disk) 102 that may or may not be attached to a computer network 104, computer memory (RAM) 106, at least one computer processing unit (CPU) 108, and instruction filter 110. The transformed output may be visualized through a number of devices 114 which may or may not be connected through a computer network 112. Certain embodiments of the display include (but are not limited to), a mobile phone, tablet device, virtual reality headset, computer monitor and immersive projection devices. Embodiment may be entirely through hardware, software or a combination of both, all of which could be considered a 'circuit' or 'module'.

Figure 2:
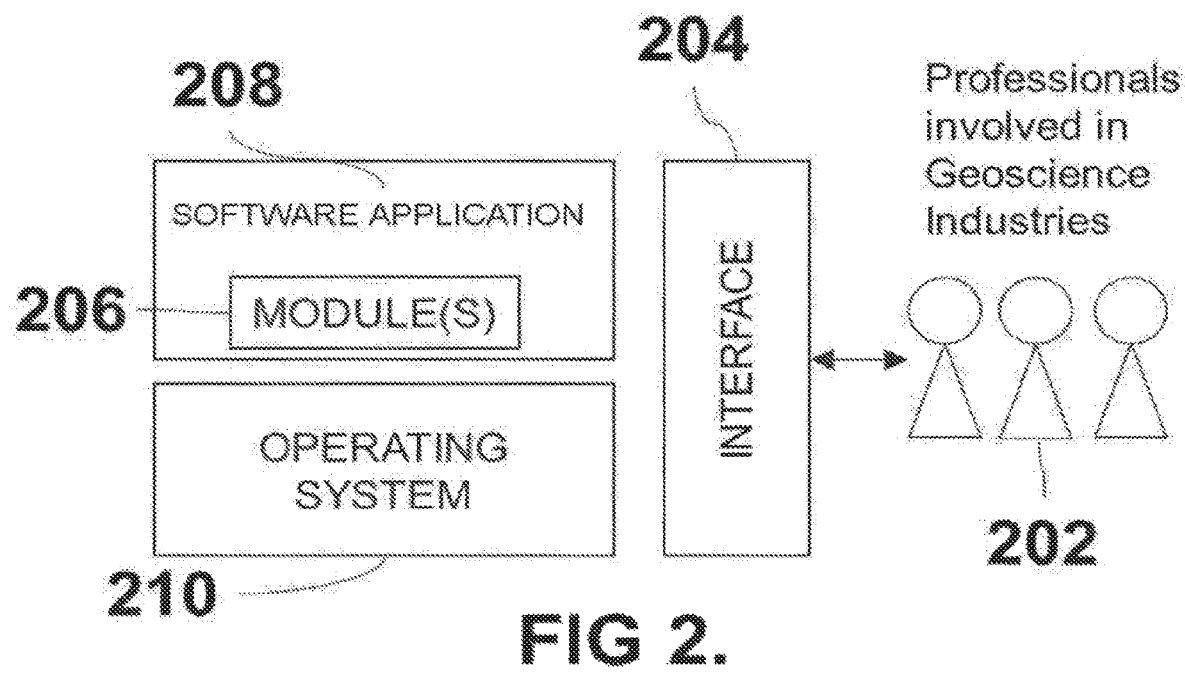
FIG. 2 provides a schematic illustrating an exemplary software system, modules, operating system and user interface.

In FIG. 2 an example of the overall system, a user 202 interacts through an interface 204 with the transformed derived information products generated by modules 206 in a computer program 208 running on a computer operating system 210. Computer program languages could include (but are not limited to) Python, R, C++, Java etc.

Figure 3:
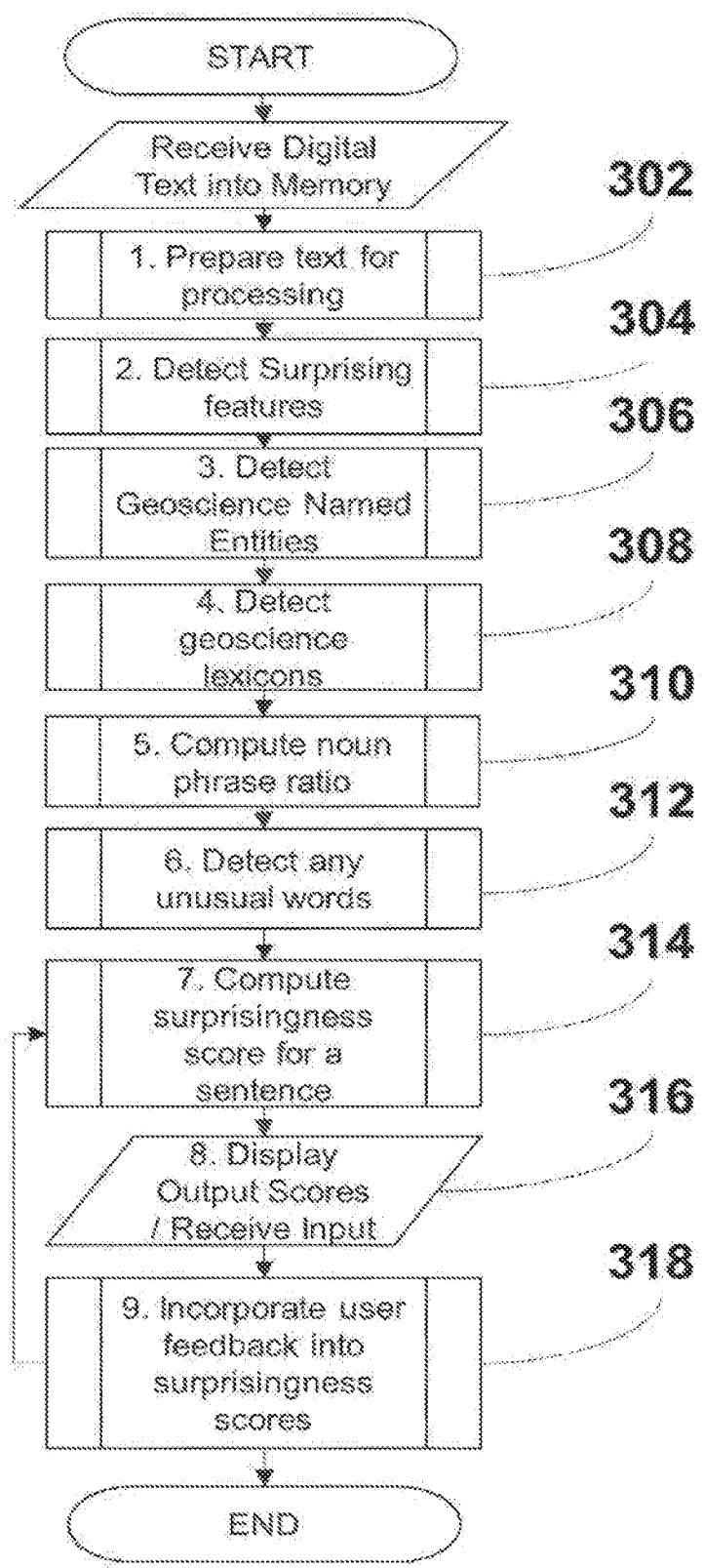
FIG. 3 illustrates a flowchart of operations summarizing the computation of a surprisingness score, unusual words and user feedback in accordance with one or more embodiments of the present techniques.

The methods and systems of various embodiments of the present invention are further described with reference to FIG. 3. First, an initial reading of a sentence from a plurality of sentences into memory and instructions to prepare the text for processing 302. Second, a module to detect surprising informative features in the sentence 304. Third, a module to detect any Named Entities in the sentence 306. Fourth, a module to detect any geoscience lexicons present in the sentence 308. Fifth, a module to compute the ratio of noun phrases in the sentences compared to the total words in the sentence 310. Sixth, the detection of any unusual words in the sentence in context to geoscience lexicon terms or background language models 312. Seventh, the computation of a surprisingness score using the outputs from each of these modules 314. Eighth, instructions to export the surprisingness scores and sentences to a file or display the surprisingness scores on a visual display 316. Finally, a module to record user input (feedback) and adjust the surprisingness score accordingly 318. Each embodiment of these areas is described further below.

During text processing (302), the geoscience lexicons, informative features and sentence tokens can be turned into a hash table. This allows (for performance optimization) very fast checking for whether any terms-features are present (without knowing what they are). If none are present, the module can be skipped. If they are present, a score for the necessary category in the module can be given. In this method it is not necessary to identify what specific term is present in order to compute the score, enhancing speed of processing.

Figure 4:
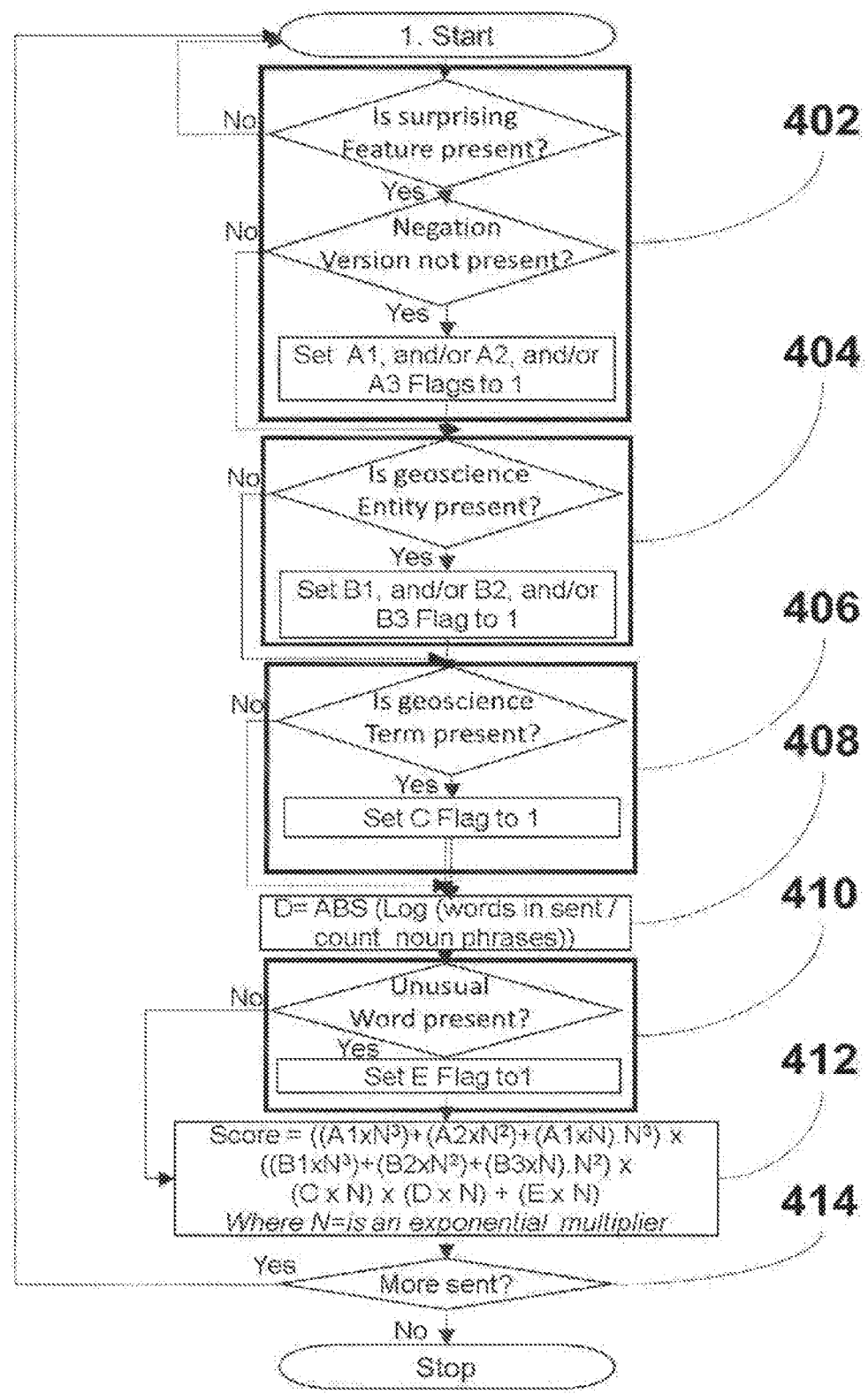
FIG. 4 illustrates a flow chart describing the computation of a surprisingness score in accordance with one or more embodiments of the present techniques.

FIG. 4 elaborates on the steps taken to compute the surprisingness score. For the surprising informative features 402, three categories are shown (A1-high, A2-medium and A3-low surprisingness). A preferred embodiment is to create these sets through geoscientists labeling sentences and subsequently training a machine learning classifier using these labelled sentences (such as a Bayesian or Support Vector Machine (SVM), Random Forest (RF) etc. with word order) to derive the informative features for each category. If a small training set is used (<10,000), then manual editing of the informative features may be required to mitigate obvious noise. If negation terms precede the informative features (such as "not unexpected") then that informative feature is skipped (not included). The output is whether a sentence contains: high (A1), medium (A2), low (A3) informative features (or none) which are used for weighting in the surprisingness score.

Detection of geoscience Named Entities 404 may consists of three categories of Named Entity types. B1—Lithostratigraphic classes (e.g. Supergroup, Group, Formation, Member, Bed); B2—Chronostratigraphic, Geoscience, Geographical types classes (e.g. Jurassic, Basin, Graben, Horst, Mountain, Northwest); and B3—Lithology classes (e.g. Sandstone, Carbonate, Shale, Salt, Clay).

The module detects these terms and whether they are preceded by a Proper Noun (using Part of Speech (PoS) tagging). For example, 'Balder Formation', 'Permian Basin', 'Atlas Mountains', 'Kimmeridge Clay'. If preceding Proper Nouns are detected, a Named Entity is counted for that category. The resulting output of the module is a series of flags indicating whether: (B1), (B2), or (B3) Named Entities are present in the sentence, which are used for weighting in the surprisingness score.

Detection of geoscience lexicons 406 is a binary computation (either they are present in the sentence or they are not). Lemma variants can be used which is a preferred embodiment (e.g. "black shales", "blackish shales"). Geoscience lexicons can be obtained from public domain or proprietary sources and tuned to the sub-domain of use. For example if applied to economic mining geoscience, terms such as "ore body" would need to be present. Output (C.) is used for weighting purposes in the surprising score.

The number of noun phrases is computed 408 in the sentence using common public domain or proprietary algorithms. The token length of the sentence is computed. A ratio of the number of noun phrases/total words in the sentence is computed and the log (absolute) of this ratio computed for (D). This ensures that long sentences (or short sentences) do not receive a bias from the noun phrase count, with proportional weighting. The output is parameter D for use in the surprising score computation.

Where a sentence contains geoscience lexicon words a module 410 detects which associated words in the sentence do not begin with a capital letter, do not contain a number, are greater than three characters long and are present in the English language (WordNet). This subset is compared to a lexicon trained on public domain geoscience literature (and/or company proprietary text) for frequently occurring words. If any words are not in this set or background language model, they are deemed unusual. The output is a list of unusual words (E) for display and use in the surprisingness score computation.

The surprising score computation module 412 applies exponential weighting in descending order A, B, C, D and E.

In FIG. 4 this is illustrated by parameter N3, N2 and N. Within categories A and B, exponential weighting (N3, N2 and N) is also applied in descending order A1, A2, and A3, and B1, B2 and B3. Additional weightings are applied from the geoscience lexicon occurrence (N×C), noun phrases (N×D) and unusual words (N×E).

Figure 6:
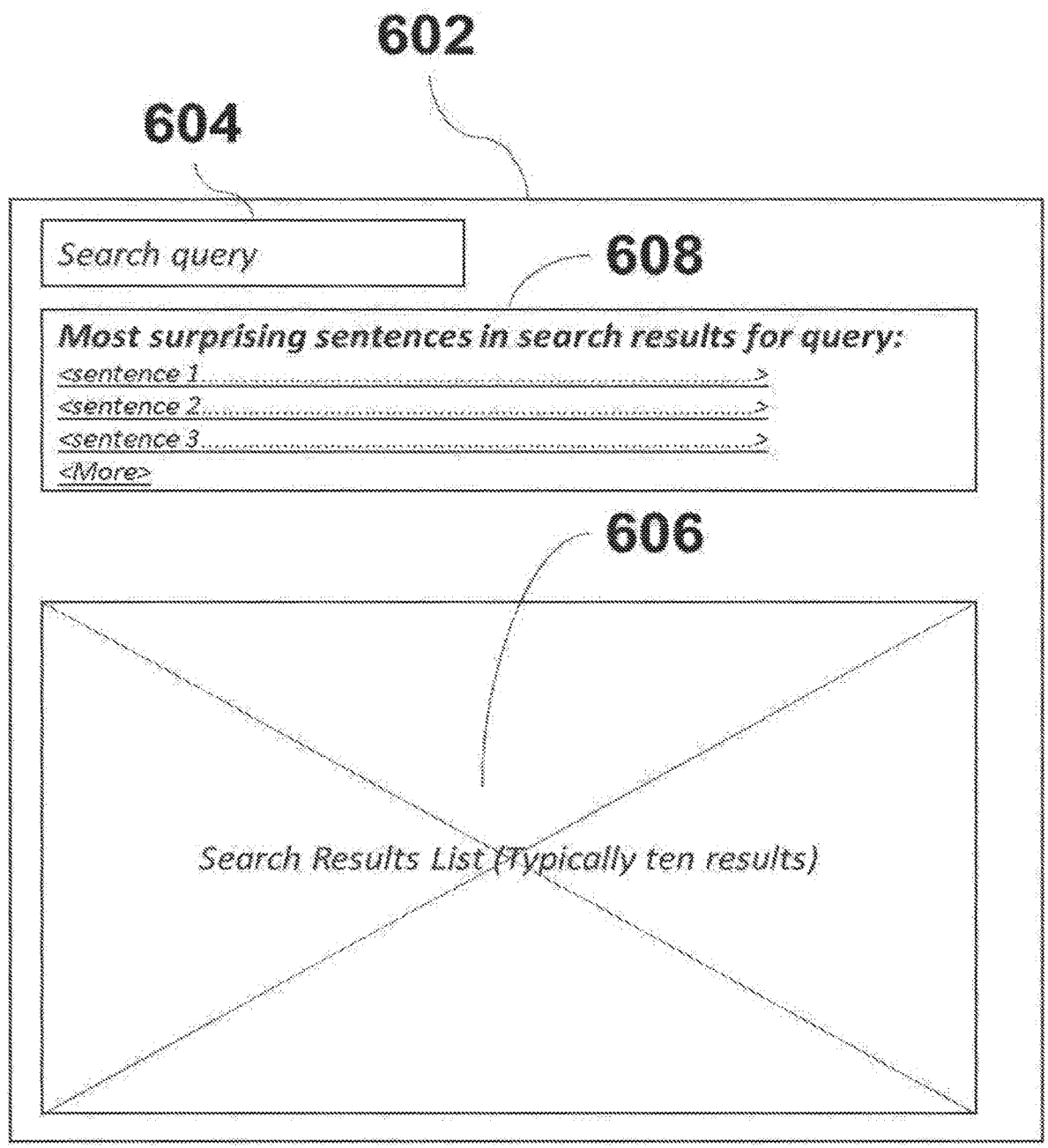
FIG. 6 is a drawing illustrating use of said output in a search user interface in accordance with one or more embodiments of the present techniques.

FIG. 5 shows the output of the method, with a surprisingness score 502 ranging from zero for the ten sentences at the bottom of the figure, to the highest top ten scores at the top of the FIG. 504. FIG. 6 shows how it can be displayed in a search user interface 602. The usual features of a search results page are present, the search box 604 and search results list 606. A preferred embodiment is displaying the most surprising sentences contained within the document search results list at the top of the search results page in a separate block 608, allowing a user to click on a sentence which would show the context (paragraph/document).

An active learning component could be implemented in a number of ways. A preferred embodiment is using implicit clickthrough (where a geoscientist clicks on a surprising sentence) to boost the informative features in the statistical model that are present in that sentence. Another embodiment is using explicit voting buttons to allow a geoscientist to vote whether they found the sentence surprising or not. This allows the system to learn from usage, whilst acknowledging that usage is likely to be small in the geoscience domain compared to the Internet consumer domain. This is compensated by the geoscience theory driven natural language processing and machine learning element described previously in this system, therefore the system is not reliant on user feedback in order to present useful information, differentiating it from other methods.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A computer implemented process for suggesting surprising sentences from geoscience text, the process comprising:
   using labeling by geoscientists to place training data into categories of surprisingness;
   training a machine learning classifier with the training data;
   receiving into memory:
   data comprising sentences of text, geoscience lexicons, surprising informative features derived through supervised machine learning, common associated terms lexicon and Natural Language Processing (NLP) rules,
   processing the data in the computer memory to detect geoscience and geographical entities,
   processing the data in the computer memory with the machine learning classifier to compute a surprisingness score for every sentence; and
   outputting the sentence and surprisingness score, by:
   applying a filter for every sentence, the filter detecting a presence of elements comprising surprising informative features, geoscience/geographical entities, geoscience terms of interest, noun phrases and unusual associated words, the filter output providing input into a module that is configured to compute a surprisingness score by combining these elements.

2. The computer-implemented process of claim 1 further comprising:
   computing of any unusual contextual words in a sentence containing terms from a geoscience lexicon of interest; and
   outputting the unusual contextual words, by:
   comparing the words in the sentence that contains a geoscience term of interest and a prior set of words created from a training set of sentences; and
   applying a function that checks that any unusual words do not being with a capital letter, do not contain a number, are greater than three characters long, and are present in the English language.

3. The computer-implemented process of claim 2 further comprising:
   receiving into memory:
   human feedback from presentation of sentences ranked by surprisingness score processing the data in computer memory using a computer processor to incorporate the feedback into the surprisingness score, by
   boost weights of surprising informative features present in a sentence subject to the human feedback in a statistical model.

4. A system for conducting a surprisingness analysis of a geoscience text, the system comprising:
   one or more computers having one or more processors executing computer readable instructions for a plurality of computer modules comprising:
   a text preparation module configured to prepare a sentence from a plurality of sentences for analysis;
   a trained machine learning classifier to identify surprising informative features, the machine learning classifier being trained using training data, the training data being placed into categories of surprisingness using labeling by geoscientists;
   an entity identification module configured to detect named entities in the sentence;
   a geoscience lexicon identification module configured to detect geoscience lexicons in the sentence;
   a noun identification module configured to compute a ratio of noun phrases in the sentence compared to the total words in the sentence;
   an unusual word identification module configured to detect unusual words in the sentence in the context to geoscience lexicon terms or background language models;
   a computation module configured to determine a surprisingness score for the sentence using outputs of the text preparation module, the surprising informative features module, the entity identification module, the geoscience lexicon identification module, the noun identification module, and the unusual word identification module; and
   an output module configured to export the surprisingness core and sentences to a file or to display the surprisingness score on a visual display.

5. A method for determining a surprisingness score of one or more sentences in a geoscience text, the method comprising:

using labeling by geoscientists to place training data into categories of surprisingness;

training a machine learning classifier with the training data;

identifying, via the trained machine learning classifier, surprising informative features;

detecting the surprising informative features in the one or more sentences;

detecting geoscience named entities in the one or more sentences;

detecting geoscience lexicons in the one or more sentences;

computing a ratio of the number of noun phrases in the one or more sentences to the total number of words in the one or more sentences;

detecting unusual words in the one or more sentences;

computing a surprisingness score for the one or more sentences, wherein the surprisingness score is based on weighting of the detected surprising informative features, geoscience named entities, geoscience lexicons, and unusual words in the one or more sentences; and outputting the surprisingness score.

6. The method of claim 5, wherein detecting surprising informative features in the one or more sentences comprises:

determining whether a surprising feature is present;

determining whether a negation is present; and if no negation is present, identifying the surprising informative feature as a high informative feature, medium informative feature, or low informative feature.

7. The method of claim 6, wherein the high informative feature, medium informative feature, or low informative feature are identified using the trained machine learning classifier.

8. The method of claim 5, wherein identifying the geoscience named entities comprises:

identifying terms related to one or more of lithostratigraphic class, chronostratigraphic class, geoscience class, geographical class, and lithology class; and determining whether the identified terms are preceded by a proper noun, and if a preceding proper noun is determined counting the term as a geoscience named entity.

9. The method of claim 5, wherein determining unusual words comprises:

detecting a subset of words in the sentence that are in the English language, do not begin with a capital letter, do not contain a number, and are more than three characters long; and comparing the subset of words to a lexicon for frequently occurring words; and identifying words from the subset of words as unusual words if they are not present in the lexicon for unusual words.

10. The method of claim 5, wherein computing the surprisingness score comprises an exponential weighting of the surprising informative features, geoscience named entities, geoscience lexicons, and unusual words.

* * * * *